UNITED STATES PATENT OFFICE.

FRITZ HOFMANN, OF ELBERFELD, AND KURT GOTTLOB, OF VOHWINKEL, NEAR ELBERFELD, GERMANY, ASSIGNORS TO SYNTHETIC PATENTS CO. INC., OF NEW YORK, N. Y., A CORPORATION OF NEW YORK.

CAOUTCHOUC SUBSTANCE AND VULCANIZATION PRODUCT THEREOF.

1,149,580.   Specification of Letters Patent.   Patented Aug. 10, 1915.

No Drawing.   Application filed July 31, 1914.  Serial No. 854,343.

*To all whom it may concern:*

Be it known that we, FRITZ HOFMANN and KURT GOTTLOB, doctors of philosophy, chemists, citizens of the German Empire, residing at, respectively, Elberfeld and Vohwinkel, near Elberfeld, Germany, have invented new and useful Improvements in New Caoutchouc Substances and Vulcanization Products Thereof, of which the following is a specification.

In Patents 1,081,613 and 1,081,614 there are described new caoutchouc substances and the vulcanization products thereof, which are obtained by treatment of the autopolymerization product of beta-gamma-dimethylerythrene with basic substances and by vulcanization of the resulting products.

In application Serial Nos. 795,505 and 795,506, filed October 16, 1913, there are described new caoutchouc substances and the vulcanization products thereof, which are obtained by the treatment of natural and synthetic caoutchouc substances with open carbon chain bases or closed carbon chain bases and by vulcanization of the resulting products. It has now been found that similar improved results can be obtained by the use of other bases having a dissociation constant greater than $1 \times 10^{-8}$, and which show an alkaline reaction at the vulcanization temperature, among which may be mentioned ammonia compounds and derivatives, both inorganic and organic, such as sodium amid and borate of ammonia, aromatic diamins such as para-phenylene-diamin and naphthylamin, the quaternary ammonium bases, benzylamid, aldehyde-ammonia or the products of condensation of ammonia with aldehydes such as formaldehyde, acetaldehyde, benzaldehydes, etc. *e. g.* hexamethylenetetramin and the other methyleneamins, etc. These compounds have normally a basic reaction, or show an alkaline reaction at the temperature of vulcanization. Only a small amount of the basic compound is necessary, *e. g.* about 1 per cent.

In the process of the present invention a small amount of the base is incorporated with caoutchouc either before or at the time when sulfur or other vulcanizing agents are added and before vulcanization. Thereafter vulcanization is effected. The vulcanization process is thereby materially shortened and promoted, and proceeds more smoothly. The base remains either physically or chemically combined in the vulcanized caoutchouc product. Both soft and hard vulcanized products can be obtained.

The rubber or caoutchouc used in the process of the present invention may be either natural or synthetic such as the natural Pará-rubber, plantation rubber, etc., or the polymerization products of erythrene, isoprene, beta-gamma-dimethylerythrene, etc. The process of the present invention is accordingly of general application, being modified, however, somewhat by the presence or absence of nitrogenous and other substances which are normally present in natural rubber.

The following examples further illustrate the novel process and the production of the novel products of the present invention.

Example 1: 100 parts of isoprene caoutchouc are mixed with 10 parts of sulfur and 2 parts of para-phenylenediamin, and heated in a vulcanizing press for 30 minutes at 3 atmospheres pressure. The product is completely vulcanized. Without the addition of the base the vulcanization process would normally take more than four times as long a time for its completion. The product made with the para-phenylenediamin contains this base combined either physically or chemically therein.

Example 2: 100 parts of Pará-caoutchouc is mixed with 10 parts of sulfur and 1 part of aldehyde-ammonia (the product of addition of acetaldehyde and ammonia) and heated to 130–135° C. for one-half hour at 3 atmospheres pressure. The material is well vulcanized. Without this addition about 4 times as much time would be required. The aldehyde-ammonia remains in the resulting product in a state of combination, probably partly or wholly chemical, although it is not desired to limit the process or product by any theoretical explanation.

Example 3: If in the process of Example 2 sodium amid is substituted for the aldehyde-ammonia in corresponding amount, a similar result is obtained.

Instead of the caoutchouc mentioned in the above examples, caoutchoucs of other origins or compositions can be used, such as plantation rubber, normal synthetic caoutchouc or the polymerization products of erythrene, beta-gamma-dimethylerythrene, etc. In a similar manner the autopolymerization products of beta-gamma-dimethylbutadiene (Kondakow, *J. pr. Chemie*, 64, pp. 109-110) can be used, or the product obtained by the action of basic substances on this product (U. S. Patent 1,081,634). Similarly other bases can be used, e. g. ammonium borate, benzylamin, naphthylenediamin, quaternary ammonium bases, etc. The addition of the bases materially shortens the usual time of vulcanization. If the process is continued for a longer time, a lower temperature can be employed, or if the process is continued at the usual temperature and for the usual time a larger combination of sulfur is effected.

We claim:—

1. The process of producing vulcanized rubber which comprises incorporating with rubber a small amount of an ammonium compound having a dissociation constant greater than $1 \times 10^{-8}$ and having a basic reaction at the vulcanization temperature, and heating the resulting product with a vulcanizing agent to effect vulcanization.

2. The process of producing vulcanized rubber which comprises incorporating with rubber a small amount of an aldehyde ammonium compound, and heating the resulting product with a vulcanizing agent to effect vulcanization.

3. The process of producing vulcanized rubber which comprises incorporating with rubber a small amount of a compound of acetaldehyde and ammonia, and heating the resulting product with a vulcanizing agent to effect vulcanization.

4. As a new article of manufacture vulcanized rubber combined before vulcanization with a small amount of an ammonium compound having a basic reaction at the vulcanization temperature and having a dissociation constant greater than $1 \times 10^{-8}$.

5. As a new article of manufacture vulcanized rubber combined before vulcanization with a small amount of an aldehyde ammonium compound.

6. As a new article of manufacture, vulcanized rubber combined before vulcanization with a small amount of a compound of acetaldehyde and ammonia.

In testimony whereof we have hereunto set our hands in the presence of two subscribing witnesses.

FRITZ HOFMANN. [L. S.]
KURT GOTTLOB. [L. S.]

Witnesses:
  HELEN NUFER,
  ALBERT NUFER.

DISCLAIMER.

1,149,580.—*Fritz Hofmann*, Elberfeld, and *Kurt Gottlob*, Vohwinkel (near Elberfeld), Germany. CAOUTCHOUC SUBSTANCE AND VULCANIZATION PRODUCT THEREOF. Patent dated August 10, 1915. Disclaimer filed February 11, 1927, by the assignee, *The Grasselli Chemical Co.*

Hereby enters this disclaimer and disclaims:

(a) From the scope of said claims 1 and 4 of said Letters Patent, in the process of producing vulcanized rubber and the new article of manufacture, vulcanized rubber, therein set forth, the use of ammonia, dimethylamin, and diethylamin, which are substances set forth in U. S. Patents 1,081,613 and 1,081,614, referred to in lines 11 to 17 of page 1 of the specification of said Patent No. 1,149,580.

(b) From the scope of said claims 1 and 4 of said Letters Patent, in the process of producing vulcanized rubber and the new article of manufacture, vulcanized rubber, therein set forth, the use of methylene bases as set forth in U. S. Patent No. 1,126,469, issued on application Serial No. 795,505, and U. S. Patent No. 1,130,903, issued on application Serial No. 795,506, which are the applications referred to in lines 18 to 25 of page 1 of the specification of said Patent No. 1,149,580; and the use of para-amino-dimethylanilin as a member of the group of substances so described as methylene bases in said Patents Nos. 1,126,149 and 1,130,903 and the applications therefor.

(c) The word "naphthylamin" in lines 35 and 36 of page 1 of the specification of said Letters Patent No. 1,149,580, which should have read "naphthylenediamin."

[*Official Gazette March 1, 1927.*]